(12) United States Patent
Haag et al.

(10) Patent No.: US 7,669,585 B2
(45) Date of Patent: Mar. 2, 2010

(54) FUEL INJECTION SYSTEM

(75) Inventors: Gottlob Haag, Markgroeningen (DE); Andreas Posselt, Muehlacker (DE); Marko Lorenz, Grossbottwar (DE)

(73) Assignee: Robert Bosch GmbH, Stuttgart (DE)

( * ) Notice: Subject to any disclaimer, the term of this patent is extended or adjusted under 35 U.S.C. 154(b) by 426 days.

(21) Appl. No.: 11/579,311

(22) PCT Filed: Jun. 12, 2006

(86) PCT No.: PCT/EP2006/063092

§ 371 (c)(1),
(2), (4) Date: Nov. 1, 2006

(87) PCT Pub. No.: WO2007/028663

PCT Pub. Date: Mar. 15, 2007

(65) Prior Publication Data

US 2008/0251605 A1    Oct. 16, 2008

(30) Foreign Application Priority Data

Aug. 5, 2005   (DE) .................. 10 2005 036 952

(51) Int. Cl.
*F02M 69/46*   (2006.01)
*F02M 69/50*   (2006.01)
(52) U.S. Cl. ..................... 123/456; 123/557
(58) Field of Classification Search ............... 123/456, 123/557, 549, 543, 552; 239/135, 128
See application file for complete search history.

(56) References Cited

U.S. PATENT DOCUMENTS

| 3,354,872 | A | * | 11/1967 | Gratzmuller | 123/557 |
| 3,762,378 | A | * | 10/1973 | Bitonti | 123/557 |
| 3,999,525 | A | * | 12/1976 | Stumpp et al. | 123/557 |
| 4,397,287 | A | * | 8/1983 | Pierard | 123/557 |
| 4,886,032 | A | * | 12/1989 | Asmus | 123/557 |
| 5,092,303 | A | * | 3/1992 | Brown | 123/538 |
| 5,218,944 | A | * | 6/1993 | Leonard | 123/557 |
| 5,335,639 | A | * | 8/1994 | Siefkes | 123/545 |
| 5,915,626 | A |   | 6/1999 | Awarzamani et al. | |
| H1820 | H |   | 12/1999 | Graves | |

FOREIGN PATENT DOCUMENTS

| DE | 2 057 972 | 6/1972 |
| DE | 196 29 589 | 1/1998 |
| EP | 0 247 697 | 12/1987 |
| GB | 1 373 933 | 11/1974 |
| WO | 2005/024225 | 3/2005 |

* cited by examiner

*Primary Examiner*—Mahmoud Gimie
(74) *Attorney, Agent, or Firm*—Michael J. Striker

(57) ABSTRACT

A fuel injection system (1) with at least one fuel injector (1a) and a heatable adapter (1b), which is connected to a fuel rail (1c) and to the fuel injector (1a) of the fuel injection system (1); a thermoswitch (2) is provided in the fuel rail (1c), which is connected with an external door contact switch (3) and with the heatable adapter (1b). The thermoswitch (2) includes a thermosensor, so that a reliable cold start is ensured by the fact that, when a previously specified fuel temperature is fallen below, the thermoswitch (2) switches over and causes fuel (8) to be heated.

15 Claims, 1 Drawing Sheet

FUEL INJECTION SYSTEM

CROSS-REFERENCE TO RELATED APPLICATION

The invention described and claimed herein below is also described in German Patent Application DE 10 2005 036 952.9 filed on Aug. 5, 2009. This German Patent Application, whose subject matter is incorporated here by reference, provides the basis for a claim of priority of invention under 35 U.S.C. 119(a)-(d).

BACKGROUND OF THE INVENTION

The present invention relates to a fuel injection system.

The related art refers to, e.g., a fuel injector with a heating device for heating the fuel on its discharge side, as described in DE 196 29 589 A1. In the fuel injector described in DE 196 29 589 A1, the power loss of the energized solenoid coil is used to heat the fuel, and, as the heat-exchange section, a Peltier element which functions as a heat pump is provided; the Peltier element includes the nozzle needle and the fuel inside it.

The disadvantage is that the fuel in the fuel injector described in DE 196 29 589 A1 is also heated when it has a temperature that is already high enough for combustion. As a result, it is possible that too much thermal energy will be supplied to the fuel.

A further disadvantage is the fact that a Peltier element is provided as a heat pump to heat the fuel in the fuel injector; it is relatively cost-intensive and, when used in the fuel injector, it requires a large quantity of electrical power.

Publication DE 20 57 972 A1 makes known a cold-start and warm-up device for internal combustion engines with externally-supplied ignition; it provides that the fuel injector is heated by an electrically operated heater core which is permanently installed in the inlet fitting of the fuel injector.

The disadvantage is that a fuel injector is provided for the cold-start and warm-up device described, which includes an electrically operated heater core which is permanently installed in the inlet fitting. Fuel injectors without permanently installed heater cores can not be used in the device described in DE 20 57 972 A1.

SUMMARY OF THE INVENTION

It is the object of the present invention, therefore, to heat the fuel injector before the engine is started, independently of an electronic control unit, without supplying an unnecessarily large amount of heat; heating is prevented when the temperature of the fuel in the fuel rail is above a previously defined threshold temperature.

An advantage of the present invention is that the heating concept of the inventive fuel injection system is independent of the control-unit platform and of the type of fuel injector used, since the heatable adapter can be inserted into a direct-injection fuel injector and into a fuel injector for manifold injection.

This results in the advantage that the individual components of the inventive fuel injection system can also be marketed for foreign systems.

A further advantage of the present invention is increased starting reliability, in particular when fuels containing ethanol are used, because the fuel is heated as a function of the fuel temperature.

A further advantage of the inventive fuel injector is the fact that, in the cold state, the idling quality of the engine is improved by heating the fuel using the inventive fuel injection system.

It is also an advantage that the fuel can be heated independently of the start of the engine or the actuation of the ignition.

The fuel injection system described in the present invention is simple, robust, and flexible; it therefore also results in a cost-optimizing effect in production.

Due to the fact that heated fuel is injected in the combustion chamber, complete combustion of the fuel is ensured. This advantageously results in lower emissions.

It is also advantageous that the risk of bubbles forming when the fuel is heated is reduced, since thermal energy is supplied only when the threshold temperature of the fuel is fallen below. Advantageously, the fuel is heated only when it is too cold.

An exemplary embodiment of the present invention is presented—in a simplified view—in the drawing and is described in greater detail in the description below.

DESCRIPTION OF THE PREFERRED EMBODIMENTS

Figure 1:
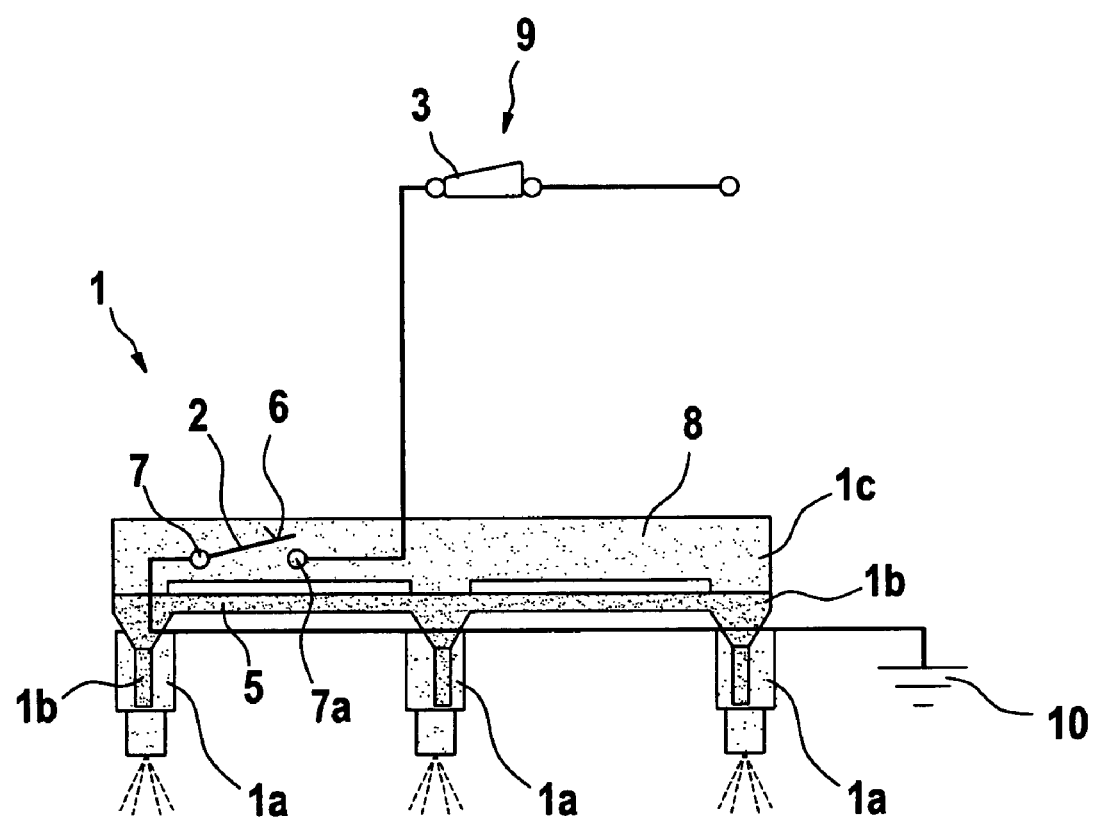
FIG. 1 shows an inventive fuel injection system, which is composed of several fuel injectors, a heatable adapter, and a fuel rail.

FIG. 1 shows an inventive fuel injection system 1 with at least one fuel injector 1a and a heatable adapter 1b, which is connected to a fuel rail 1c and to fuel injector 1a of fuel injection system 1; a thermoswitch 2 is provided in fuel rail 1c, which is connected with a device 3 which establishes external contact, and with heatable adapter 1b.

Thermoschalter 2 includes a thermosensor, which triggers a switching procedure of thermoswitch 2 when fuel 8 located in fuel rail 1c has a temperature that is below a specified threshold temperature. Thermoswitch 2 itself can be designed as a bimetallic strip or a thermistor. Electrical heating elements 5 are provided in heatable adapter 1b; they heat fuel 8 that flows from fuel rail 1c into related fuel injector 1a. Heating fuel 8 is advantageous when atomized fuel 8 would condense on the cold combustion chamber wall because the combustion chamber had become cold.

Thermoswitch 2 is composed of a pressure-resistant material to ensure that it remains in a stable position inside fuel rail 1c, in which a certain pressure prevails. To prevent a chemical reaction of fuel 8 in contact with thermoswitch 2 with the surface material of thermoswitch 2, surface 6 of thermoswitch 2 is composed of a fuel-resistant material.

Thermoswitch 2 includes at least two electrical connections 7, 7a. One electrical connection 7a is connected with device 3, which establishes the external contact. A closed switch position 9 of device 3 is at least one prerequisite for actuation of thermoswitch 2 and, therefore, for the heating of fuel 8.

External device 3 can be, e.g., a door contact switch, a remote control, a seat sensor, or the like, by way of which it is possible to initiate heating of fuel 8 even before the internal combustion engine is started (e.g., 10 to 30 s in advance).

The switch position of the external door contact switch is coupled, e.g., with an actuation of a door. When this door is opened, the switch position of the door contact switch changes from an open switch position to closed switch position 9, and the heating of fuel 8 begins.

Electrical heating elements 5 are located in heatable adapter 1b and are connected with a contact 7 of thermoswitch 2 and with a circuit ground 10.

Thermoswitch 2 is located in fuel rail 1c such that it is fully immersed in fuel 8 located in fuel rail 1c, thereby making it possible to close a circuit depending on the temperature of fuel 8, to supply current to electrical heating elements 5 in heatable adapter 1b.

The present invention is not limited to the exemplary embodiments shown, and can be used, e.g., with direct-injection fuel injectors and with fuel injectors that inject fuel into a manifold.

What is claimed is:

1. A fuel injection system (1) comprising a fuel rail (1c); at least one fuel injector (1a); a heatable adapter (1b), which is connected to the fuel rail (1c) and to the fuel injector (1a); a device which establishes external contact; and a thermoswitch (2) which is provided inside the fuel rail (1c) and which is connected with the device (3) which establishes external contact and with the heatable adapter (1b), wherein the heatable adaptor (1b) is provided inside the fuel rail (1c).

2. The fuel injection system as recited in claim 1, wherein the thermoswitch (2) includes a thermosensor.

3. The fuel injection system as recited in claim 1, wherein electrical heating elements (5) are provided in the heatable adapter (1b).

4. The fuel injection system as recited in claim 1, wherein the thermoswitch (2) is designed as a thermistor or a bimetallic strip.

5. The fuel injection system as recited in claim 1, wherein the thermoswitch (2) is composed of pressure-resistant material.

6. The fuel injection system as recited in claim 1, wherein a surface (6) of the thermoswitch (2) is composed of fuel-resistant material.

7. The fuel injection system as recited in claim 1, wherein the thermoswitch (2) is fully immersed in the fuel (8) located in the fuel rail (1c).

8. The fuel injection system as recited claim 1, wherein the thermoswitch (2) includes at least two electrical connections (7, 7a).

9. The fuel injection system as recited in claim 8, wherein an electrical connection (7a) of the thermoswitch (2) is connected with the device (3).

10. The fuel injection system as recited in claim 9, wherein the switch position (9) of the device (3) must be closed for the thermoswitch (2) to be activated.

11. The fuel injection system as recited in claim 1, wherein the contact-establishing device (3) is a door contact switch, a remote control, or a seat sensor.

12. The fuel injection system as recited in claim 1, wherein the device (3) can be actuated independently of the operation of an internal combustion engine.

13. The fuel injection system as recited in claim 11, wherein an actuation of the door contact switch is coupled with an actuation of a door.

14. The fuel injection system as recited in claim 1, wherein current is supplied to the electrical heating elements (5) of the heatable adapter (1b) when the device (3) and the thermoswitch (2) both have a closed switch position (9).

15. The fuel injection system as recited in claim 1, wherein the heatable adapter (1b) is inserted in the fuel injector (1a).

* * * * *